United States Patent
Permuy

(10) Patent No.: US 9,387,481 B2
(45) Date of Patent: Jul. 12, 2016

(54) ROTARY DRUM APPARATUS COMPRISING A ROTARY DRUM AND AT LEAST ONE ELECTRIC MOTOR FOR DRIVING THE DRUM, WITH A STATOR EXTENDING AGAINST A PART OF CIRCUMFERENCE OF THE DRUM

(71) Applicant: GE Energy Power Conversion Technology Ltd, Rugby, Warwickshire (GB)

(72) Inventor: Alfred Permuy, Rueil-Malmaison (FR)

(73) Assignee: GE ENERGY POWER CONVERSION TECHNOLOGY LIMITED, Rugby, Warwickshire (GB)

( * ) Notice: Subject to any disclaimer, the term of this patent is extended or adjusted under 35 U.S.C. 154(b) by 454 days.

(21) Appl. No.: 13/957,837

(22) Filed: Aug. 2, 2013

(65) Prior Publication Data
US 2014/0034767 A1 Feb. 6, 2014

(30) Foreign Application Priority Data
Aug. 3, 2012 (FR) ...................................... 12 57604

(51) Int. Cl.
| | |
|---|---|
| B02C 17/24 | (2006.01) |
| H02K 41/025 | (2006.01) |
| H02K 7/14 | (2006.01) |
| H02K 16/00 | (2006.01) |

(52) U.S. Cl.
CPC *B02C 17/24* (2013.01); *H02K 7/14* (2013.01); *H02K 16/00* (2013.01); *H02K 41/025* (2013.01); *H02K 2201/15* (2013.01); *H02K 2213/12* (2013.01)

(58) Field of Classification Search
CPC .......... B02C 17/24; H02K 7/14; H02K 16/00; H02K 41/025; H02K 2201/15; H02K 2213/12
USPC ............................... 241/299, 101.2, 176, 170
See application file for complete search history.

(56) References Cited

U.S. PATENT DOCUMENTS

| | | | |
|---|---|---|---|
| 3,555,329 A | 1/1971 | Meyer | |
| 2003/0094524 A1 | 5/2003 | Scuccato | |
| 2010/0033035 A1 | 2/2010 | Hosle | |

FOREIGN PATENT DOCUMENTS

| | | |
|---|---|---|
| DE | 102007005131 | 1/2008 |
| FR | 1334283 | 8/1963 |
| WO | 2012100818 | 8/2012 |

OTHER PUBLICATIONS

French Search Report from corresponding French Application No. 1257604, Dated Mar. 5, 2013.

*Primary Examiner* — Mark Rosenbaum
(74) *Attorney, Agent, or Firm* — GE Global Patent Operation; Catherine J. Toppin

(57) ABSTRACT

A rotary drum apparatus comprising a drum rotatable around a longitudinal axis, and at least one electric motor for driving the drum in rotation around the longitudinal axis, each drive motor comprising a stator and a rotor, the rotor comprising at least one ring portion joint together with the drum and extending substantially perpendicularly to the longitudinal axis. The stator of each drive motor extending against a part of circumference of the drum perpendicularly to the longitudinal axis.

19 Claims, 3 Drawing Sheets

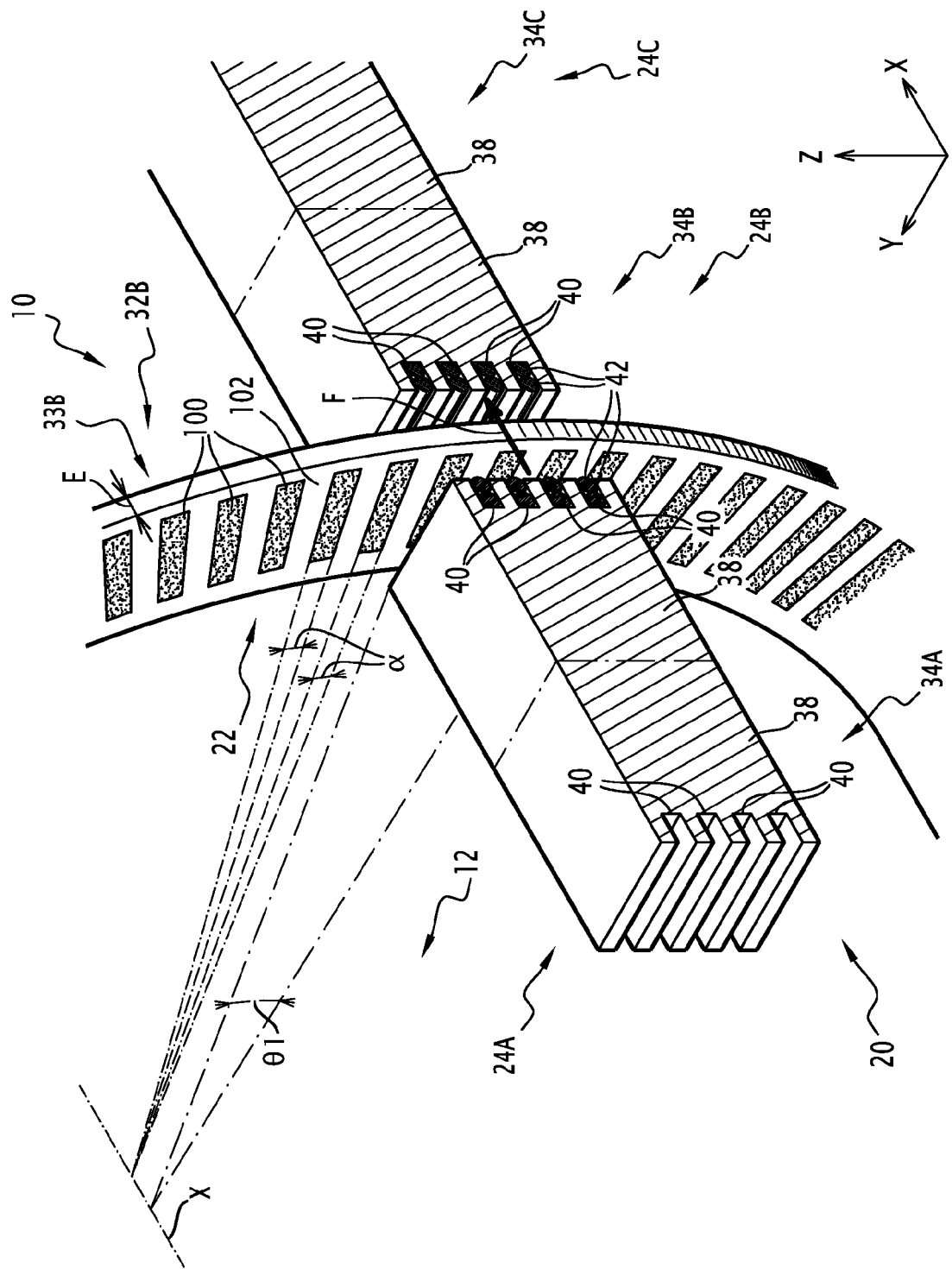

ROTARY DRUM APPARATUS COMPRISING A ROTARY DRUM AND AT LEAST ONE ELECTRIC MOTOR FOR DRIVING THE DRUM, WITH A STATOR EXTENDING AGAINST A PART OF CIRCUMFERENCE OF THE DRUM

CROSS-REFERENCE TO RELATED APPLICATIONS

This application claims foreign priority under 35 U.S.C. §119 to co-pending French Patent Application No. 1257604, filed Aug. 3, 2012, which is hereby incorporated by reference in its entirety.

BACKGROUND OF THE INVENTION

Embodiments of the present invention apply, in particular, to an ore crusher, the drum then being adapted to receive an ore to be crushed.

A rotary drum apparatus of aforementioned type is described in U.S. Pat. No. 3,555,329. This apparatus is a cement mill comprising a drum around a longitudinal axis and a motor for driving the drum in rotation around the longitudinal axis. The motor comprises a rotor joined together with the drum, and a stator having a stator winding. The stator winding is adapted to generate a magnetic field driving the rotor in rotation.

The stator is in the form of a revolution ring around the longitudinal axis. The stator surrounds perpendicular to the longitudinal axis, the rotor which is itself fixed to the periphery of the drum along a plane perpendicular to the longitudinal axis. The stator then extends against the entire circumference of the drum along a plane perpendicular to the longitudinal axis.

However, such a rotary drum apparatus has reliability problems related to mechanical vibrations of the drum and associated mechanical deformations. The drum can have high-value diameter, generally between 5 meters and 12 meters, along the plane perpendicular to the longitudinal axis. This leads to significant operating losses when the drive motor is damaged and must be stopped in order to be repaired.

BRIEF SUMMARY OF THE INVENTION

According to an embodiment of the present invention, there is provided a rotary drum apparatus offering better reliability, while being less sensitive to vibrations of the drum and associated mechanical deformations.

Embodiments of the present invention relate to a rotary drum apparatus of aforementioned type, wherein the stator of each drive motor extends against a part of circumference of the drum perpendicular to the longitudinal axis.

According to an embodiment of the present invention, there is provided a rotary drum apparatus. The rotary drum comprises a drum rotatable around a longitudinal axis and at least one motor for driving the drum in rotation around the longitudinal axis. Each drive motor comprises a stator and a rotor, the rotor comprising at least one ring portion extending substantially perpendicular to the longitudinal axis.

According to embodiments of the present invention, the rotary drum apparatus comprises one or several of the following characteristics, taken individually or according to all technically possible combinations: the part of circumference of the drum against which the stator extends has an angular sector of value less than 90°, more particularly less than 60°, more particularly substantially equal to about 30°; the apparatus comprises two motors for driving the drum in rotation around the longitudinal axis; the stators of both motors are significantly diametrically opposed with respect to the longitudinal axis, and the rotors of both motors comprise at least one ring joint with both motors, said ring being joined together with the drum and extending substantially perpendicularly to the longitudinal axis; each electric drive motor is a linear motor; each drive motor comprises several separate modules, distributed along the longitudinal axis, each module comprising a rotor element and a stator element, the rotor element comprising at least one ring portion extending substantially perpendicularly to the longitudinal axis and the stator element extending against only a part of circumference of the drum; both drive motors comprise the same number of modules, each stator element of a motor being substantially diametrically against to the corresponding stator element of the other motor, relative to the longitudinal axis; each rotor element of a motor comprises a ring, said ring being joint with a corresponding rotor element of the other motor and extending substantially perpendicularly to the longitudinal axis; the drum has, perpendicular to the longitudinal axis, a maximum diameter of value greater than 1 meter, more particularly greater than 2 meters, more particularly greater than 4 meters; at least one ring portion comprises plurality of ferromagnetic elements angularly offset with respect to each other around the longitudinal axis; and the apparatus is an ore crusher, the drum being adapted to receive an ore to be crushed.

BRIEF DESCRIPTION OF THE DRAWINGS

These characteristics and advantages of the invention will become apparent on reading the following description, given only as non-limiting example, and made in reference to the annexed drawings, wherein:

FIG. 3 is a view similar to that of FIG. 2 according to an embodiment of the present invention.

DETAILED DESCRIPTION OF THE INVENTION

In this specification, the term "substantially equal to" expresses an equality relationship of plus or minus 5%.

Figure 1:
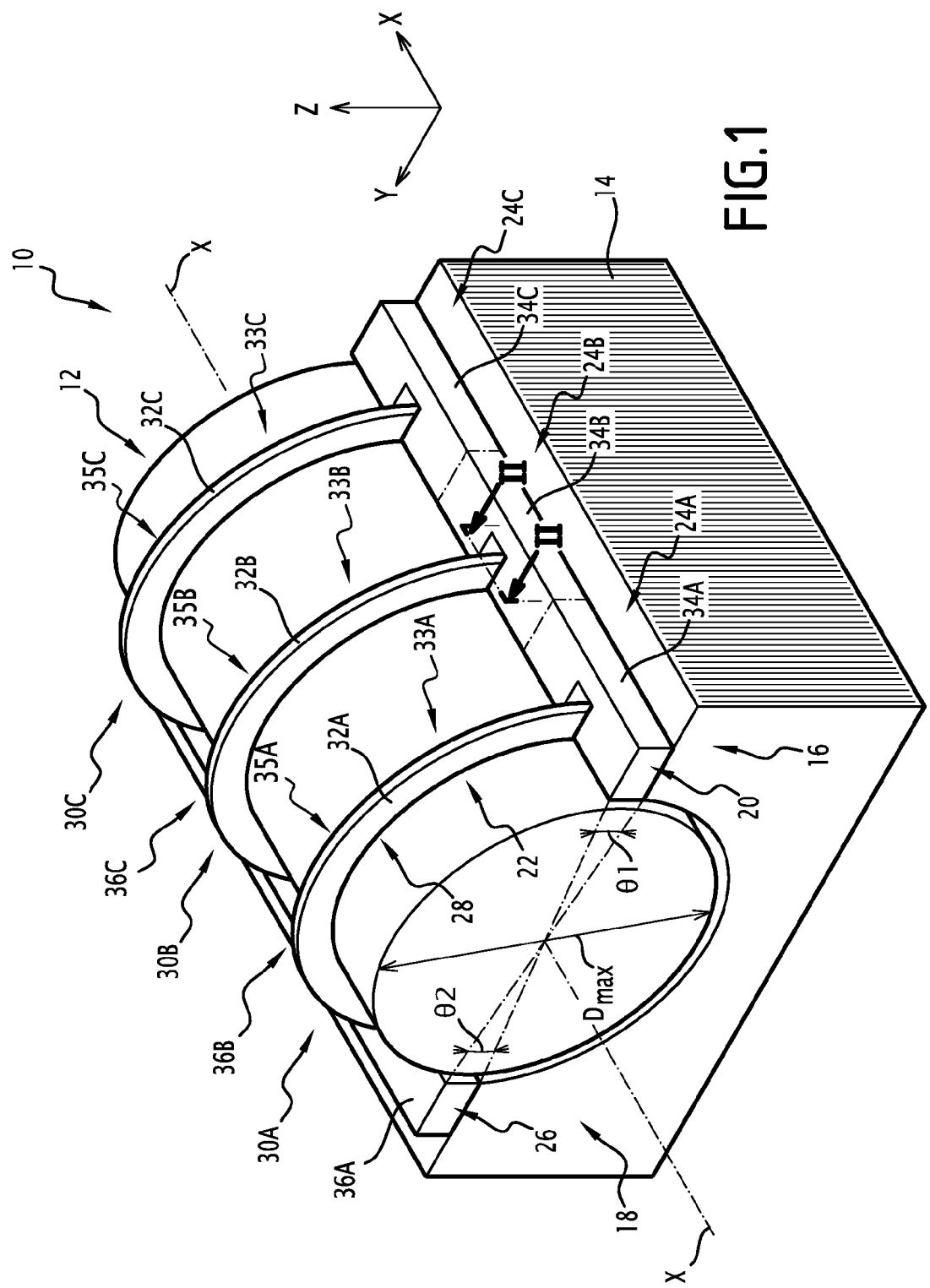
FIG. 1 is a diagram of a rotating drum apparatus according to an embodiment of the present invention.

In FIG. 1, a rotary drum apparatus 10 comprises a drum 12 rotatable around a longitudinal axis X, a retaining frame 14 of the drum 12, and at least one electric motor 16, 18 for driving the drum 12 in rotation around the longitudinal axis X.

In an embodiment as illustrated in FIG. 1, the rotary drum apparatus 10 comprises a first electric motor 16 and a second electric motor 18; both electric motors 16, 18 being adapted to drive the drum 12 in rotation around the longitudinal axis X.

The rotary drum apparatus 10 is, in an embodiment, an ore crusher, and the drum 12 is adapted to receive an ore to be crushed. In addition, the drum 12 is adapted to receive steel balls, in order to facilitate ore crushing.

The drum 12 extends along the longitudinal axis X and has, perpendicularly to the longitudinal axis X, a maximum diameter Dmax, as illustrated in FIG. 1, of value greater than 1 meter.

According to an embodiment, the maximum diameter Dmax of the drum 12 more particularly has a value greater than 2 meters, more particularly a value greater than 4 meters and even more particularly a value greater than 10 meters. The value of the maximum diameter Dmax of the drum 12 is, according to an embodiment, between 5 meters and 12 meters.

The drum 12 has a shape of revolution around the longitudinal axis X, and is, in an embodiment, in the shape of a revolving cylinder around the axis X.

According to an embodiment, the drum 12 has, at each of its ends along the longitudinal axis X, a narrowing for the insertion, respectively extraction of the ore. The ends of the drum 12, not shown in FIG. 1 for sake of simplicity, are supported by the retaining frame 14, particularly during rotation of the drum 12.

According to an embodiment, the retaining frame 14 is adapted to hold the drum 12 by its ends both axially along the longitudinal axis X and radially along radial direction perpendicular to the longitudinal axis X. The retaining frame 14 is, in an embodiment, made of concrete.

According to an embodiment, the first drive motor 16 comprises a first stator 20 and a first rotor 22. In an embodiment illustrated in FIG. 1, the first drive motor 16 is made in the form of first separate modules 24A, 24B, 24C, distributed along the longitudinal axis X.

According to an embodiment, the second drive motor 18 comprises second stator 26 and second rotor 28. In an embodiment illustrated in FIG. 1, the second drive motor 18 is made in the form of second separate modules 30A, 30B, 30C, distributed along the longitudinal axis X.

According to an embodiment, the first motor 16 and the second motor 18 are, linear motors. These first and second linear motors 16, 18 form the induction machines. The first and second motors 16, 18 are then asynchronous motors. Each electric motor 16, 18 may have an electrical power, for example, greater than 10 MW.

According to an embodiment, both drive motors 16, 18 comprise, the same number of separate modules 24A, 24B, 24C, 30A, 30B, 30C. According to an embodiment as illustrated in FIG. 1, the number of first separate modules 24A, 24B, 24C is equal to 3, and the number of second separate modules 30A, 30B, 30C is equal to 3.

According to an embodiment, the first stator 20 and second stator 26 extends against a part of the circumference of the drum 12, perpendicularly to the longitudinal axis X, as shown in FIG. 1. The part of the circumference of the drum 12 against which extends the first stator 20 has a first angular sector $\theta 1$ around the longitudinal axis X, and the part of the circumference of the drum 12 against which extends second stator 26 has a second angular sector $\theta 2$ around the longitudinal axis X, as illustrated in FIG. 1.

The first angular sector $\theta 1$ and the second angular sector $\theta 2$ have values less than 90°, more particularly less than 60°, more particularly equal to 30°.

According to an embodiment, the first stator 20 and second stator 26 are substantially diametrically opposed with respect to the longitudinal axis X. The first stator 20 and the second stator 26 are, for example, fastened directly to the retaining frame 14.

According to an embodiment, the rotor 22, 28 of each drive motor 16, 18 comprises at least one ring portion 32A, 32B, 32C extending substantially perpendicularly to the longitudinal axis X. The rotor 22, 28 of each drive motor is joined together with the drum 12.

According to an embodiment as illustrated in FIG. 1, the rotor 22, 28 of each drive motor 16, 18 comprises a first ring 32A, a second ring 32B and a third ring 32C. The first 32A, second 32B and third 32C rings being joint with each drive motor 16, 18 and extending substantially perpendicularly to the longitudinal axis X.

According to an embodiment, the first three modules 24A, 24B, 24C each comprise a respective first rotor member 33A, 33B, 33C and a respective first stator element 34A, 34B, 34C.

According to an embodiment, the second modules 30, 30A, 30B, 30C each have a respective second rotor element 35A, 35B, 35C and a respective second stator member 36A, 36B, 36C.

According to an embodiment, the first 32A, second 32B and third 32C rings are spaced from each other along the longitudinal axis X. The first 32A, second 32B and third 32C rings are joined together with the drum 12. The first 32A, second 32B and third 32C rings are fixed to the outer periphery of the drum 12, for example, using bolts and nuts. According to an embodiment, the first 32A, second 32B and third 32C rings are welded to the outer periphery of the drum 12.

Figure 2:
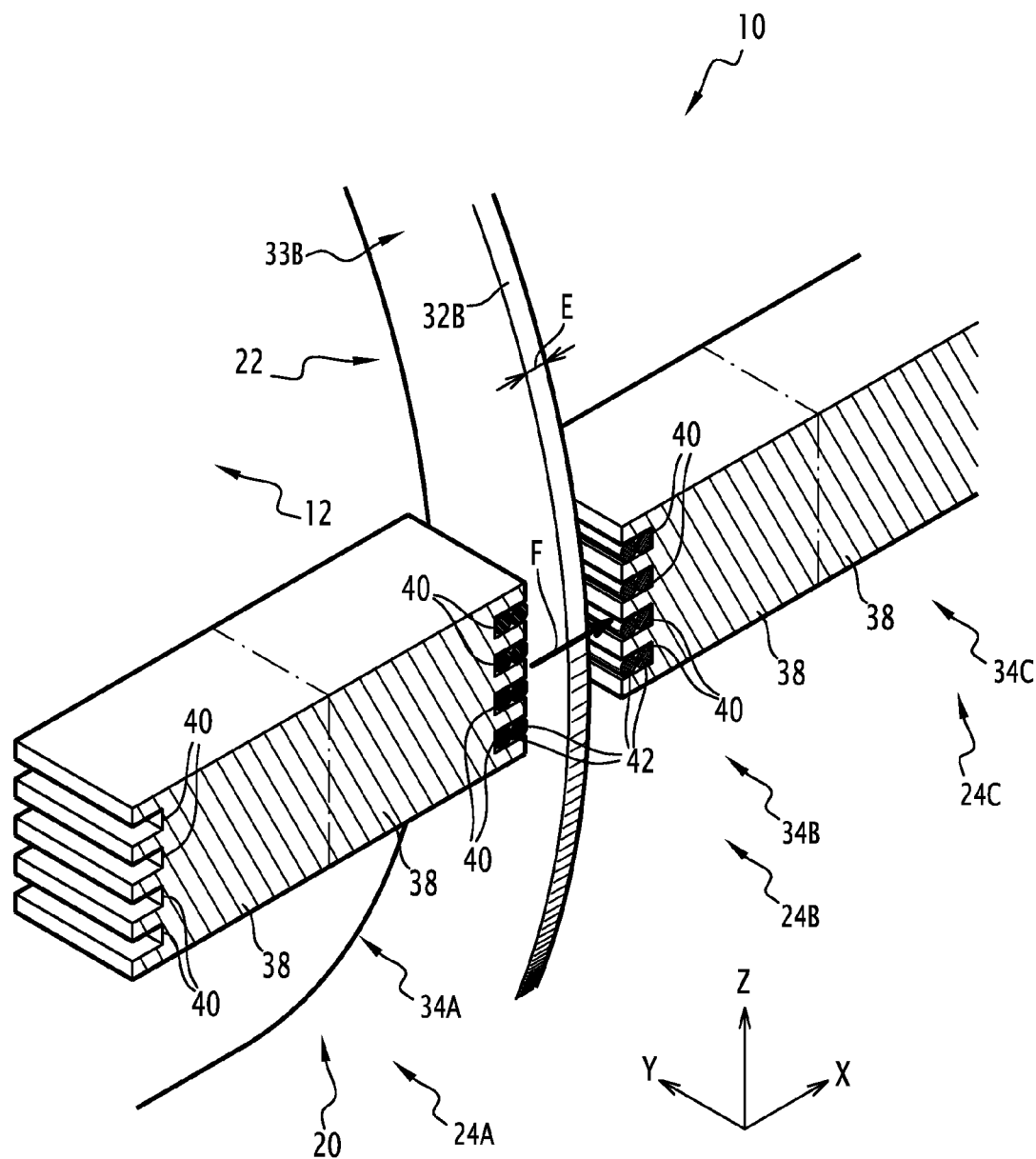
FIG. 2 is a sectional view along the place in FIG. 1 according to an embodiment of the present invention.

According to an embodiment, each ring 32A, 32B, 32C has a thickness E along the longitudinal axis X, as shown in FIG. 2. The thickness E is on the order of centimeters.

According to an embodiment, each ring 32A, 32B, 32C comprises several angular segments attached to each other as a result of others at outer periphery of the drum 12. Each segment has a respective angular sector, and the sum of angular sectors of different segments forming the ring 32A, 32B, 32C correspond to the angular sector of said ring 32A, 32B, 32C.

According to an embodiment, each ring 32A, 32B, 32C is made of a copper alloy. According to an embodiment, each ring 32A, 32B, 32C is made of an aluminum alloy.

According to an embodiment, the first rotor elements 33A, 33B, 33C are formed respectively by the first ring 32A, the second ring 32B and the third ring 32C.

According to an embodiment, the first stator elements 34A, 34B, 34C extend against part of circumference of the drum 12 perpendicularly to the longitudinal axis X, and the part of circumference of the drum 12 against which the first stator elements 34A, 34B, 34C extends corresponding to the first angular sector $\theta 1$ described previously.

According to an embodiment as illustrated in FIG. 1, each first stator element 34A, 34B, 34C is substantially diametrically opposed to a second corresponding stator element 36A, 36B, 36C, with respect to the longitudinal axis X.

According to an embodiment, the first set of stator elements 34A, 34B, 34C form the first stator 20 of the first motor. The number of first stator elements 34A, 34B, 34C is equal to the number of rings 32A, 32B, 32C forming the first rotor elements 33A, 33B, 33C.

According to an embodiment, the second rotor elements 35A, 35B, 35C are formed by the first ring 32A, the second ring 32B, and the third ring 32C respectively.

According to an embodiment, the first set of rotor elements 33A, 33B, 33C form the first rotor 22 and the set of second rotor elements 35A, 35B, 35C form the second rotor 28, the first rotor 22 and the second rotor 28 being joined in an embodiment as illustrated in FIG. 1. In other words, the first ring 32A is joint with the respective first rotor element 33A and the second rotor element 35A of first and second motors 16, 18. Similarly, the second ring 32B and third ring 32C are joint with the respective first rotor elements 33B, 33C and second rotor elements 35B, 35C of first and second electric motors 16, 18.

According to an embodiment, the second stator elements 36A, 36B, 36C extend against a part of circumference of the drum 12, perpendicularly to the longitudinal axis X, and the part of circumference of the drum 12 against which the second stator elements 36A, 36B, 36C extends corresponds to the second angular sector $\theta 2$ described previously.

According to an embodiment, the second set of stator elements 36A, 36B, 36C form the second stator 26 of the second motor. The number of second stator elements 36A, 36B, 36C is equal to the number of rings 32A, 32B, 32C forming the second rotor elements 35A, 35B, 35C.

According to an embodiment, each stator element 34A, 34B, 34C, 36A, 36B, 36C comprises, in the known manner, a core 38 in which notches 40, and windings 42 housed in the notches 40 are arranged, as shown in FIG. 2. In FIG. 2, only the first stator element 34B is shown in detail for the sake of simplification.

According to an embodiment, the notches 40 extend substantially perpendicularly to the longitudinal axis X, and the windings 42 are configured to generate an axial flux along the longitudinal axis X when they are electrically powered (arrow F).

According to an embodiment as illustrated in FIG. 2, the notches 40 are parallel to each other.

According to an embodiment, the notches 40 are not parallel and each are arranged along a respective radial direction, perpendicular to the longitudinal axis X. Such an arrangement of notches 40 allows sliding, between the stator 20, 26 and the rotor 22 of the corresponding motor 28, constant throughout the length of the rotor 22, 28 following the radial direction.

According to an embodiment, during the operation of the rotary drum apparatus 10, the first stator elements 34A, 34B, 34C and the second stator elements 36A, 36B, 36C are electrically powered in order to generate an axial flux along the longitudinal axis X.

According to an embodiment, each axial flux (arrow F) then acts on the ring 32A, 32B, 32C respectively, and drives said rotor ring 32A, 32B, 32C following a direction perpendicular to the flux generated, in the known manner.

According to an embodiment, the magnetic effect exerted on the rotor rings 32A, 32B, 32C by the first and second stators 20, 26 then drives the drum 12 in rotation around the longitudinal axis X, the drum 12 being supported at its ends by the retaining support 14.

According to an embodiment, the drive motor(s) 16, 18 of the rotary drum apparatus 10 are much simpler to manufacture than the drive motor of the state-of-the-art rotary drum apparatus, since the corresponding stator 20, 26 has dimensions far less than those of the state-of-the-art stator, the stator 20, 26 does not extend over the entire circumference of the drum 12, but only on a part of said circumference.

According to an embodiment, the drive motor(s) 16, 18 depend very little on the size of the drum 12, more particularly the value of its maximum diameter Dmax.

In an embodiment, the drive motor(s) 16, 18 are in segmented form, while comprising several separate modules 24A, 24B, 24C, 30A, 30B, 30C. This further facilitates manufacturing of the drive motor(s) 16, 18.

According to an embodiment, realization in segmented form of the drive motor(s) 16, 18 also allows to provide operation redundancy, since in case of failure of a module among various modules 24A, 24B, 24C, 30A, 30B, 30C of the drive motor(s), it is sufficient to electrically isolate this faulty module, all while continuing to power supply the other modules. This allows to ensure continuity of operation of the rotary drum apparatus 10 in case of failure of a given module 24B, the stator elements 34A, 34C of other modules 24A, 24C being always capable of rotating the drum 12 around the longitudinal axis X through the magnetic effect exerted on the first and third ring 32A, 32C.

According to an embodiment, the stator(s) 20, 26 are adapted to generate an axial flux along the longitudinal axis X, and the drive motor(s) 16, 18 are then less disturbed by the radial displacements of the drum 12, these radial displacements can be relatively large, on the order of centimeters, given the imbalance of the ore to be crushed.

According to an embodiment, the arrangement diametrically opposed relative to the longitudinal axis X of first and second stators 20, 26 allows to avoid asymmetry of mechanical torque exerted on the drum 12.

FIG. 3 illustrates an embodiment of the present invention. The elements similar to embodiments described above, identified by identical references are not described again.

According to an embodiment as illustrated in FIG. 3, at least one ring portion 32A, 32B, 32C comprises a plurality of ferromagnetic elements 100 angularly offset relative to each other around the longitudinal axis. The ferromagnetic elements 100 are surrounded by a retaining part 102 made of an electrically conductive material. The corresponding ring portion 32A, 32B, 32C then forms a squirrel-cage rotor 22, 28.

According to an embodiment as illustrated in FIG. 3, each ring 32A, 32B, 32C comprises a plurality of ferromagnetic elements 100 surrounded by the retaining part 102. The first and second rotors 22, 28 are then squirrel-cage rotors.

According to an embodiment, each ferromagnetic element 100 has an angular sector $\alpha$ around the longitudinal axis X. The value of the angular sector $\alpha$ is smaller than those of the first and second angular sectors $\theta 1$, $\theta 2$. The value of the angular sector $\alpha$ is more particularly less than $\theta i/n$, where n is an integer of value greater than or equal to 2, more particularly greater than or equal to 4, and i is an index equal to 1 or 2 depending on whether the corresponding ring portion 32A, 32B, 32C belong to the first rotor part 22 or the second rotor 28.

According to an embodiment, the retaining part 102 is made of a copper alloy. According to an embodiment, the retaining part 102 is made of an aluminum alloy. According to an embodiment, the retaining part 102 is made of an alloy of copper and aluminum.

The operation of the embodiments illustrated in FIG. 3 is similar to that of the embodiments illustrated in FIGS. 1 and 2 described above, and is not described again. The advantages of the embodiments illustrated in FIG. 3 are similar to those of the embodiments illustrated in FIGS. 1 and 2 described above.

According to an embodiment, the rotary drum apparatus 10 offers better reliability while being less sensitive to vibrations of the drum and associated mechanical deformations.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotary drum apparatus comprising:
   a drum rotatable around a longitudinal axis; and
   at least one electric drive motor configured to drive the drum in rotation around the longitudinal axis, each of the at least one electric drive motor comprising a stator and a rotor, the rotor comprising at least one ring portion joined together with the drum and extending substantially perpendicularly to the longitudinal axis, wherein each of the at least one electric drive motor comprises a plurality of separate modules distributed along the longitudinal axis, each of the separate modules comprising a rotor member and a stator element, the rotor member comprising at least one ring portion extending substantially perpendicularly to the longitudinal axis and the stator element extending against a part of circumference of the drum, wherein the stator of each of the at least one electric drive motor extends against a part of circumference of the drum perpendicularly to the longitudinal axis.

2. The rotary drum apparatus according to claim 1, wherein the part of circumference of the drum against which the stator extends has an angular sector of value less than about 90°.

3. The rotary drum apparatus according to claim 1, wherein the part of circumference of the drum against which the stator extends has an angular sector of value less than about 60°.

4. The rotary drum apparatus according to claim 1, wherein the part of circumference of the drum against which the stator extends has an angular sector of value less than about 30°.

5. The rotary drum apparatus according to claim 1, wherein the at least one electric drive motor comprises two electric drive motors configured to drive the drum in rotation around the longitudinal axis.

6. The rotary drum apparatus according to claim 5, wherein the stators of both of the two electric drive motors are substantially diametrically opposed with respect to the longitudinal axis, and the rotors of both of the two electric drive motors comprise at least one ring joint with both of the two electric drive motors, the at least one ring being joint together with the drum and extending substantially perpendicularly to the longitudinal axis.

7. The rotary drum apparatus according to claim 1, wherein each of the at least one electric drive motor is a linear motor.

8. The rotary drum apparatus according to claim 1, wherein the at least one electric drive motor comprises two electric drive motor, wherein both of the two electric drive motors comprise the same number of separate modules, each stator member of an electric drive motor of the two electric drive motors being substantially diametrically against a corresponding stator element of another electric drive motor of the two electric drive motors, relative to the longitudinal axis.

9. The rotary drum apparatus according to claim 8, wherein each rotor member of the electric drive motor of the two electric drive motors comprises a ring, the ring being joint with a rotor member corresponding to the other electric drive motor of the two electric drive motors and extending substantially perpendicularly to the longitudinal axis.

10. The rotary drum apparatus according to claim 1, wherein the drum has, perpendicularly to the longitudinal axis, a maximum diameter of value greater than about 1 meter.

11. The rotary drum apparatus according to claim 1, wherein the drum has, perpendicularly to the longitudinal axis, a maximum diameter of value greater than about 2 meters.

12. The rotary drum apparatus according to claim 1, wherein the drum has, perpendicularly to the longitudinal axis, a maximum diameter of value greater than about 4 meters.

13. The rotary drum apparatus according to claim 1, wherein the at least one ring portion comprises a plurality of ferromagnetic elements angularly offset relative to each other around the longitudinal axis.

14. The rotary drum apparatus according to claim 1, wherein the rotary drum apparatus is an ore crusher and is configured to receive an ore to be crushed.

15. A drum apparatus comprising:
a drum rotatable around a longitudinal axis;
a first drive motor configured to drive the drum in rotation around the longitudinal axis, the first drive motor having a first stator extending against a part of circumference of the drum perpendicularly to the longitudinal axis, and a first rotor having at least one first rotor element comprising a first ring joined together with the drum and extending substantially perpendicularly to the longitudinal axis; and
a second drive motor configured to drive the drum in rotation around the longitudinal axis, the second drive motor having a second stator extending against a part of circumference of the drum perpendicularly to the longitudinal axis, and a second rotor having at least one second rotor element comprising the first ring.

16. The rotary drum apparatus according to claim 15, wherein:
the first stator comprises at least one first separate module distributed along the longitudinal axis; and
the second stator comprises at least one second separate module distributed along the longitudinal axis.

17. The rotary drum apparatus according to claim 15, wherein the first stator and the second stator are substantially diametrically opposed with respect to the longitudinal axis.

18. The rotary drum apparatus according to claim 15, wherein the rotary drum apparatus is an ore crusher and is configured to receive an ore to be crushed.

19. A drum apparatus, comprising:
a drum rotatable around a longitudinal axis;
a first drive motor configured to drive the drum in rotation around the longitudinal axis, the first drive motor comprising at least one first module distributed along the longitudinal axis, the at least one first module having a first rotor member and a first stator element extending against a part of circumference of the drum perpendicularly to the longitudinal axis; and
a second drive motor configured to drive the drum in rotation around the longitudinal axis, the second drive motor comprising at least one second module distributed along the longitudinal axis, the at least one second module having a second rotor member and a second stator element extending against a part of circumference of the drum perpendicularly to the longitudinal axis,
wherein the first rotor member and the second rotor member each comprise a ring that is joint with respect to the first rotor member and the second rotor member, and which extends substantially perpendicularly to the longitudinal axis.

* * * * *